2,980,610

PROCESS FOR TREATING WATER

Robert A. Ruehrwein, Dayton, Ohio, assignor to Monsanto Chemical Company, St. Louis, Mo., a corporation of Delaware No Drawing. Filed July 13, 1956, Ser. No. 597,591

1 Claim. (Cl. 210—58)

This invention relates to a process for treating water. It is an object of this invention to provide a process for treating water, in which process water-soluble polymers are employed. A further object of this invention is the provision of a process by which the hardness contained in water, which hardness may be either of artificial or natural origin, may be controlled and rendered harmless. A still further object is to render hard water precipitates such as calcium and magnesium salts innocuous for many purposes.

In the prior art it has been proposed to employ α-halogen-substituted polyacrylic acid for addition to hard water so as to prevent the formation of calcium and magnesium precipitates. In such a process in which the formation of precipitates is actually inhibited, it is necessary to use on a weight basis in the neighborhood of from 3 to 4 or 5 times as much polymer as the hard water salts present in the water being treated. Since these water-soluble polymers and particularly the α-halogen-containing polymers are quite expensive the process thus proposed has received little practical attention.

According to the present invention water containing hardness-imparting compounds is treated with a water-soluble synthetic polymer in an amount equivalent to not over about 20% of the hardness-imparting compounds present in the water, after which the hardness is precipitated. The resulting hard water precipitate is substantially innocuous.

The polymer may be polyvinyl alcohol, polyacrylamide or polymethacrylamide.

The polymers which are effective for the present purpose are characterized structurally as having a carbon to carbon backbone in which amide or hydroxy radicals are joined, not to adjacent carbon atoms, but to carbon atoms which are separated by a methylene (—CH$_2$—) radical.

Thus, the configuration of the polymer generally takes the form:

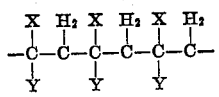

where X is selected from the group consisting of —OH and —COR; Where R is the —NH$_2$ radical and Y is selected from the group consisting of H and CH$_3$.

In its most preferred form the molecular weight of the water-soluble polymer is of importance because of its effect on the efficiency of the polymer for the present purpose and the molecular weight is accordingly preferred to be within the range of 1,000 and 10,000 molecular weight units. It is not intended, however, to limit this invention to polymers having molecular weights only within the above stated range, since the use of higher molecular weight polymers is also effective although somewhat more polymer will be required to obtain the same degree of scale prevention.

I have now discovered that when the amount of polymer added to water is restricted to not more than approximately ⅕ (or 20%) of the amount by weight of the hardness imparting compounds present, that the salt or compound which is subsequently precipitated is very much less objectionable than is the precipitate formed in the absence of the polymer. Moreover, by reason of the fact that on the order of not more than about 10% of polymer is employed in my process over the processes of the prior art, the present process becomes economically attractive.

My process is particularly adapted to the treatment of boiler waters, since when water containing hardness is evaporated the hard water salts and compounds crystallize out and unless preventive measures are taken the salts form boiler scale on the heated surfaces, which seriously impairs the flow of heat therefrom. By providing a relatively small amount of the present water-soluble polymers in the boiler water, the salts crystallizing out are rendered non-adhering to the heated boiler surfaces. The hard water salts crystallizing out are principally the carbonates, sulfates and silicates of calcium, magnesium and iron.

The amount of water-soluble polymer which I employ is materially below that amount which will sequester calcium or other hardness-imparting salts in the water. As a matter of fact, the amount of polymer is desirably maintained at not more than about 20% by weight of the hardness imparting salts or compounds present in the body of water to be treated. In many cases, it is advantageous to employ considerably less of the polymer.

My process is carried out by adding relatively small quantities of soluble polymers to hard water, that is, quantities on the order of fractional parts per million and ranging upwardly to the limit stated above, namely 20% of the hardness-forming compounds and/or salts present in the water. Thus, for example waters containing hardness may be treated with as little as from 0.1 to 3.0 parts per million and advantageous results obtained.

While the present process is particularly adapted to the treatment of water undergoing evaporation in a boiler it can also be employed in those operations where water is treated in any manner as to precipitate the hardness-forming salts in the water. For example, soluble calcium bicarbonate may be chemically transformed to calcium carbonate by treatment with soda ash and will then deposit crystals of this less soluble salt. The deposition of such calcium carbonate is rendered non-adhering to chemical equipment by the prior addition thereto of water-soluble polymers. When calcium carbonate is deposited from water solutions at a temperature above 90° C., normally the crystal form obtained (in the absence of polymer) is aragonite. When a small amount of polymer is present under these conditions the crystal form is calcite.

The temporary hardness of water may also be removed by boiling the water, in which case the calcium and magnesium salts corresponding to such hardness will precipitate. Permanent hardness is the hardness remaining in the water after it has been boiled.

The water-soluble polymers useful in the present invention are non-α-halogen-containing synthetic polymers in the sense that they are artificially prepared by the polymerization of unsaturated organic compounds. The compounds which are polymerized may be aliphatic compounds which yield alcohols or amides, which groups impart water-solubility to the polymer. As an example, esters such as vinyl acetate or propionate may be polymerized and the polymer so obtained may be hydrolyzed forming a polymer containing alcohol groups which is water-soluble. Acrylonitrile may also be converted in known manner to the polyacrylamide which is water-soluble.

The art is fully cognizant of methods by which monomeric compounds may be polymerized, hydrolyzed and neutralized and it is therefore unnecessary to describe specific means by which the various water-soluble polymers may be prepared for use in the present invention.

Examples of water-soluble polymers suitable for use in the present invention include:

Polyvinyl alcohol
Polyacrylamide

Since my discovery is applicable to a wide variety of nucleating or crystallizing systems it will, of couse, vary with the extent or the degree to which the polymer is adsorbed on the crystal nuclei. It will also vary somewhat with the molecular weight of the polymer. In this connection it has been observed that any molecular weight water-soluble polymer is effective to some extent. However, those polymers having molecular weights in the lower range, say below about 40,000 and even below 10,000 are somewhat more effective in controlling the crystal habit and properties of the deposited hard water salts. The molecular weight of the polymer should not be below 1000.

The effect of the presence of the polymer on the character of scale from hard water was demonstrated by evaporating a relatively large volume of hard water (Dayton City water having a hardness of approximately 100 p.p.m.) in a stainless steel beaker which was heated by means of an electric hot plate. A constant level device supplied feed water to the beaker so that a substantially constant volume of water (about ½ liter) was present in the evaporator at all times during the test. The test was run until 22 liters of water had been evaporated.

The method of heating the beaker caused the bottom, which was directly in contact with the hot plate, to become hotter than the sides of the beaker. It was noticed that when no polymer additive was present in the evaporator the scale whch formed upon the bottom was hard and adherent, while that which formed on the unheated sides of the beaker was loose and generally much softer and more easily removed.

This test was applied to the polymers disclosed in the list above, the concentration being 13 parts per million. The amount of scale formed on the hot area of the evaporator was determined by weighing the same. The results obtained in this series of tests are reported in Table I. In these tests the total amount of polymer necessary to treat 22 liters of water was added to the beaker at the start of the test.

TABLE I

*Compiled data on reduction of scale by water-soluble polymers*

| Water-Soluble Polymers | Conc., p.p.m. | Hard Scale on Hot Area of Evaporator, g. |
|---|---|---|
| 0 | 0 | 0.318 |
| PAA | 13 | 0.192 |
| PVA | 13 | 0.119 |

Key to the above:
PAA—polyacrylamide.
PVA—polyvinyl alcohol.

This application is a continuation-in-part of my application Serial No. 434,669, filed June 4, 1954, now abandoned.

What I claim is:

The process which comprises treating water containing hardness imparting compounds which comprise adding thereto, in an amount not over 20% by weight of the contained hardness imparting compound, a polyacrylamide polymer.

References Cited in the file of this patent

UNITED STATES PATENTS

| 2,729,557 | Booth et al. | Jan. 3, 1956 |
| 2,740,522 | Aimone et al. | Apr. 3, 1956 |
| 2,783,200 | Crum et al. | Feb. 26, 1957 |

FOREIGN PATENTS

| 559,240 | Germany | Sept. 16, 1932 |